F. S. CARR.
FASTENER.
APPLICATION FILED JAN. 31, 1919.
1,337,119.
Patented Apr. 13, 1920.
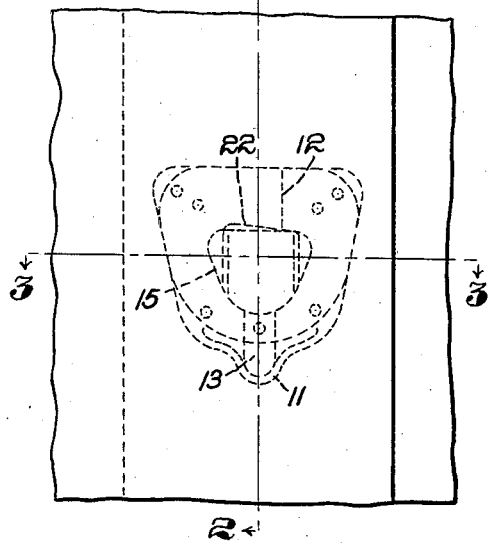
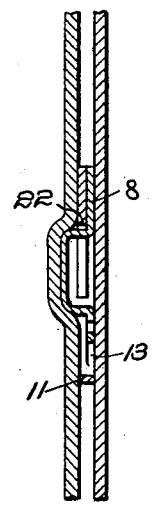
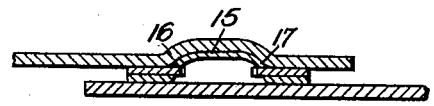
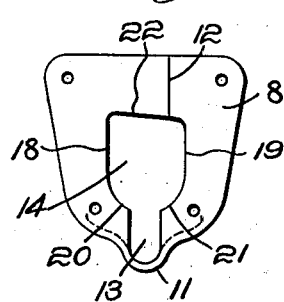
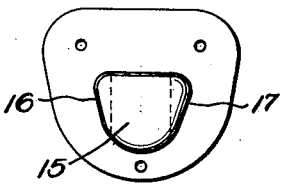
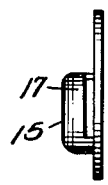
Inventor:
Fred S. Carr,
by Emery Booth Janney & Varney,
Attys.

UNITED STATES PATENT OFFICE.

FRED S. CARR, OF NEWTON, MASSACHUSETTS, ASSIGNOR TO CARR FASTENER COMPANY, OF CAMBRIDGE, MASSACHUSETTS, A CORPORATION OF MAINE.

FASTENER.

1,337,119.   Specification of Letters Patent.   Patented Apr. 13, 1920.

Application filed January 31, 1919. Serial No. 274,312.

*To all whom it may concern:*

Be it known that I, FRED S. CARR, a citizen of the United States, and a resident of Newton, in the county of Middlesex, Commonwealth of Massachusetts, (whose post-office address is care of Carr Fastener Company, Cambridge, Massachusetts,) have invented an Improvement in Fasteners, of which the following description, in connection with the accompanying drawings, is a specification, like characters on the drawings representing like parts.

This invention relates to improvements in separable fasteners and more particularly, though not exclusively, to improvements in small fasteners such as placket fasteners and the like.

In the drawings, which show on an enlarged scale a preferred form of my invention:—

Figure 1 is an elevation of a preferred form of fastener connecting overlapping layers of fabric;

Fig. 2 is a vertical section on the line 2—2 of Fig. 1;

Fig. 3 is a horizontal section on the line 3—3 of Fig. 1;

Fig. 4 shows a plan view of the preferred form of socket shown in Fig. 1;

Fig. 5 is a side elevation of the socket shown in Fig. 4;

Fig. 6 is a plan view of the preferred form of stud shown in Fig. 1; and

Fig. 7 is a side elevation of the stud shown in Fig. 6.

Referring to the drawings, and to the preferred form of my invention selected for illustrative purposes, I have shown a coöperating stud and socket in which the socket 8 is resiliently expansible, the resiliency being provided by an upstanding spring element 11 integral with the socket member 8. The socket is preferably split through its entire length, the split in that portion thereof adjacent the spring 11 being preferably central, and the split 12 at the opposite end thereof being preferably staggered or offset out of line with the split 13 in the opposite end thereof, and out of line with the central aperture 14 in the socket through which the stud 15 is adapted to pass. The stud 15 is preferably wedge-shaped as shown, and provided with overhanging abrupt shoulders 16, 17 adapted to be engaged by the sides 18, 19 of the socket. The top of the stud is tapered or rounded so that when pressed into the aperture in the socket 8 the sides thereof will be sprung apart until the stud-engaging portions 18, 19 snap into the grooves beneath the shoulders 16, 17, at which time the socket will close. The stud and socket can be readily separated by the relative moving apart of that end of the socket 8 carrying the spring 11 from the adjacent portion of the stud member. This may be easily effected by squeezing the opposite ends of the stud and socket toward one another, which will cause the stud and socket to be relatively tipped so that the smaller end of the stud 15 will bear against the curved portions 20, 21 of the aperture in the socket, causing the socket to open. When force is exerted longitudinally of the stud and socket in such a direction as to pull the stud against the end 22 of the aperture in the socket, the engagement of stud and socket is particularly strong because the slot 12 is offset at one side of the socket and therefore the pressure of the stud comes on an extended bearing at one side of the socket. The end 22 of the aperture is preferably angled, as shown, relative to the transverse axis of the socket, so that the aperture in the socket is of greater length at the side away from the slot 12 than at the side adjacent the slot 12, thereby insuring the seating of the stud against the longer bearing at the end 22 of the aperture. Where the end of the aperture in the socket is angled, as above described, I prefer that the slots providing the shoulders on the stud be of such depth that the slight twisting of the stud and the socket caused by the angling of the end of the aperture in the socket will not result in the springing apart of the sides of the socket by wedging action. Where the end of the socket is not angled, the depth of the slots may be such as to permit seating of the sides of the socket when the fastener is in engaged relation.

While I have shown and described one embodiment of my invention, it will be understood that changes involving omission, alteration, substitution and reversal of parts, and even changes in the mode of operation, may be made without departing from the scope of my invention, which is best defined in the following claims.

Claims:

1. A separable fastener comprising, in combination, a stud and a socket therefor providing an expansible stud-receiving aperture, said socket including a plate split substantially throughout its entire length and the two halves thereof connected by an upturned spring portion at one end.

2. A separable fastener comprising, in combination, a stud and a socket therefor providing an expansible stud-receiving aperture, said socket including a plate split substantially throughout its entire length and the two halves thereof connected by a spring portion at one end, said stud and socket being formed to permit separation thereof by relative tipping movement in one direction only.

3. A separable fastener comprising, in combination, a stud and a socket therefor providing an expansible stud-receiving aperture, said socket having opposite sides connected at one end by a spring portion and unsymmetrically divided at the opposite end.

4. A separable fastener comprising, in combination, a stud and a socket therefor providing an expansible stud-receiving aperture, said socket being split at one end on a line out of center with the aperture therein.

5. A separable fastener comprising, in combination, a non-circular stud providing a shoulder and a wedge portion, and a socket therefor providing an expansible non-circular stud-receiving aperture, said socket being resiliently expansible to permit the passage of said stud therethrough and resiliently contractible to engage said stud behind said shoulder, said sides of said aperture coöperating with the wedge portion of said stud to disengage said socket from said stud when said stud and socket are tipped one relative to the other in a predetermined direction.

6. A socket for separable fasteners providing a stud-receiving aperture, said socket split substantially its entire length and the two halves thereof connected by an upturned spring portion at one end only.

7. A socket for separable fasteners providing a stud-receiving aperture, said socket split substantially its entire length and the two halves thereof connected by a spring portion at one end only, the division at the opposite side of the socket from said spring portion being out of the medial line of the aperture.

8. A socket for separable fasteners providing a stud-receiving aperture, said socket having the opposite sides thereof pressed together by spring means and having the strain-receiving end of the aperture angled to crowd the stud toward one corner of the aperture.

9. A socket for stud and socket fasteners including a body portion providing a stud-receiving aperture, said body portion being divided at one end on a line out of center with the aperture therein.

10. A socket for stud and socket fasteners including a body portion providing a stud-receiving aperture, said body portion being divided at one end on a line out of center with the aperture therein, and the side of the aperture adjacent the divided end of the body portion being angled in a direction to bring the strain of the engaged stud away from the line of division.

In testimony whereof, I have signed my name to this specification.

FRED S. CARR.